US012560502B2

(12) United States Patent
Campbell et al.

(10) Patent No.: US 12,560,502 B2
(45) Date of Patent: Feb. 24, 2026

(54) ROBOTIC CELL SYSTEM FOR BALANCING A WHEEL AND TIRE ASSEMBLY

(71) Applicant: INTERNATIONAL WHEEL & TIRE COMPANY, Farmington Hills, MI (US)

(72) Inventors: Todd Allen Campbell, LaSalle, MI (US); Daniel Jonathan Ehlke, Detroit, MI (US); Mohamad Dib Kassem Hassan, Dearborn Heights, MI (US); Erik Lance Kirk McClain, Livonia, MI (US); Harsh Suresh Shah, Royal Oak, MI (US); Jeffrey N. Skomski, Macomb, MI (US); Keith Martin Smiley, Lake Orion, MI (US); Kevin Douglass Smiley, Oxford, MI (US); Mike Smiley, Hazel Park, MI (US); Don Schwenn, Fenton, MI (US); Patrick W. Zoller, Royal Oak, MI (US)

(73) Assignee: International Wheel & Tire Company, Farmington Hills, MI (US)

( * ) Notice: Subject to any disclaimer, the term of this patent is extended or adjusted under 35 U.S.C. 154(b) by 223 days.

(21) Appl. No.: 18/252,657

(22) PCT Filed: Nov. 12, 2021

(86) PCT No.: PCT/US2021/059176
§ 371 (c)(1),
(2) Date: May 11, 2023

(87) PCT Pub. No.: WO2022/104085
PCT Pub. Date: May 19, 2022

(65) Prior Publication Data
US 2024/0302240 A1     Sep. 12, 2024

Related U.S. Application Data

(60) Provisional application No. 63/113,148, filed on Nov. 12, 2020.

(51) Int. Cl.
*G01M 1/04* (2006.01)
*B66C 1/44* (2006.01)

(52) U.S. Cl.
CPC ............... *G01M 1/045* (2013.01); *B66C 1/44* (2013.01)

(58) Field of Classification Search
CPC ................................. G01M 1/045; B66C 1/44
See application file for complete search history.

(56) References Cited

U.S. PATENT DOCUMENTS 8,161,650 B2     4/2012 Lawson et al.
8,561,464 B2     10/2013 Peinelt et al.
(Continued)

FOREIGN PATENT DOCUMENTS

WO     WO-2008063212 A2 *     5/2008     ........... B60C 25/132

OTHER PUBLICATIONS

Burke Porter Group, Bepco—Tire & Wheel Robot Line. YouTube. Mar. 16, 2017. [retrieved on Feb. 13, 2022]. Retrieved from internet:<URL:https://www.youtube.com/watch?v= czwWnx9nHYQ>. entire video.

*Primary Examiner* — Wade Miles
*Assistant Examiner* — Jerrod Irvin Davis
(74) *Attorney, Agent, or Firm* — Brooks Kushman, P.C.

(57)     ABSTRACT
A wheel and tire assembly (WTA) balancing system configured to transport a WTA within a defined perimeter may include a robot including a selectively movable arm and an end effector connected to the movable arm and configured to selectively engage a portion of a WTA, and a controller configured to provide instructions to the robot to selectively move the WTA to at least one of a plurality of stations within the perimeter.

17 Claims, 10 Drawing Sheets

(56)                      References Cited

U.S. PATENT DOCUMENTS

| | | | |
|---|---|---|---|
| 8,567,453 | B2 | 10/2013 | Donnay et al. |
| 8,770,236 | B2 | 7/2014 | Reece et al. |
| 2005/0229702 | A1* | 10/2005 | Haydu .................. G01M 1/045 |
| | | | 301/5.21 |
| 2012/0073764 | A1 | 3/2012 | Lawson et al. |
| 2018/0215212 | A1 | 8/2018 | Kerwin et al. |
| 2019/0070740 | A1* | 3/2019 | Taylor ................ B65H 35/0006 |
| 2020/0316989 | A1 | 10/2020 | Kerwin |

* cited by examiner

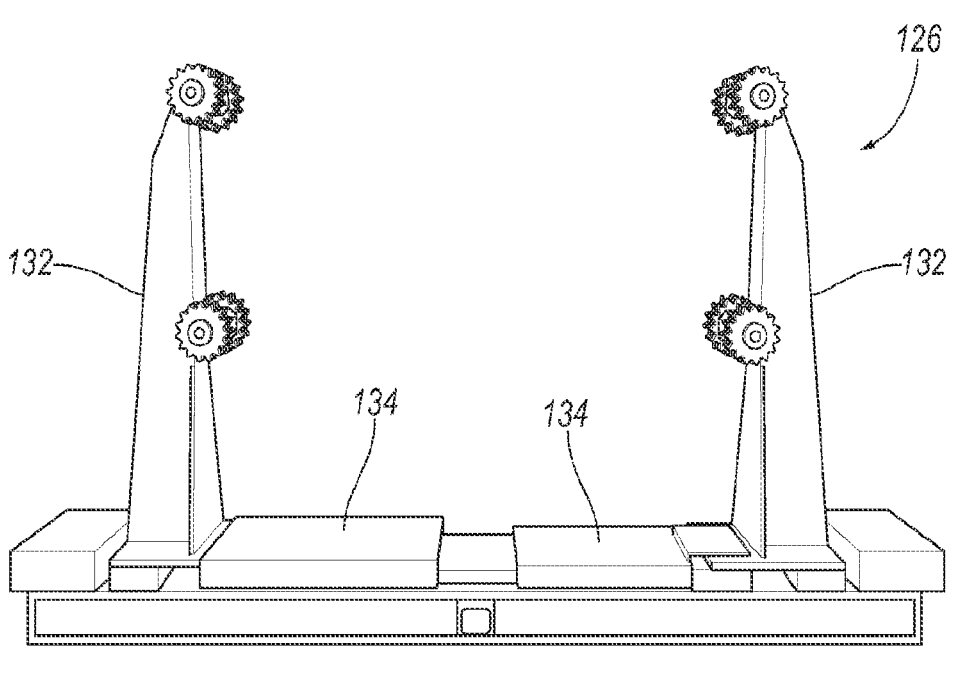
*FIG. 4*
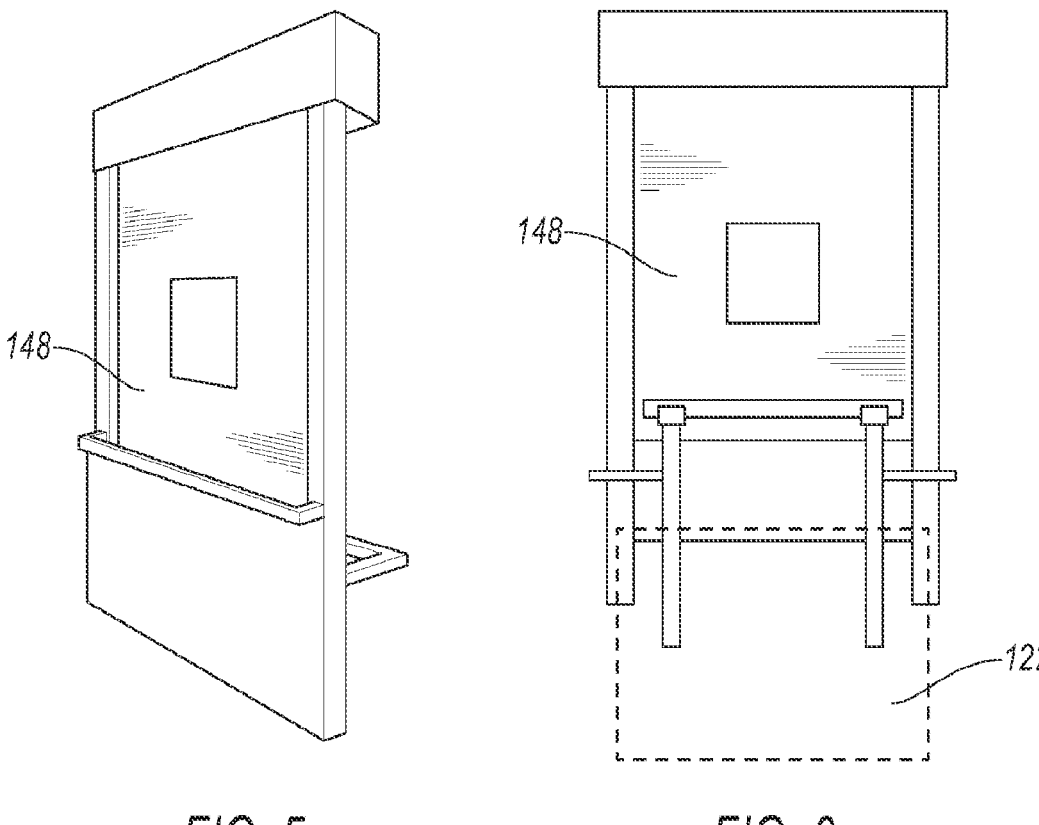
*FIG. 5*        *FIG. 6*

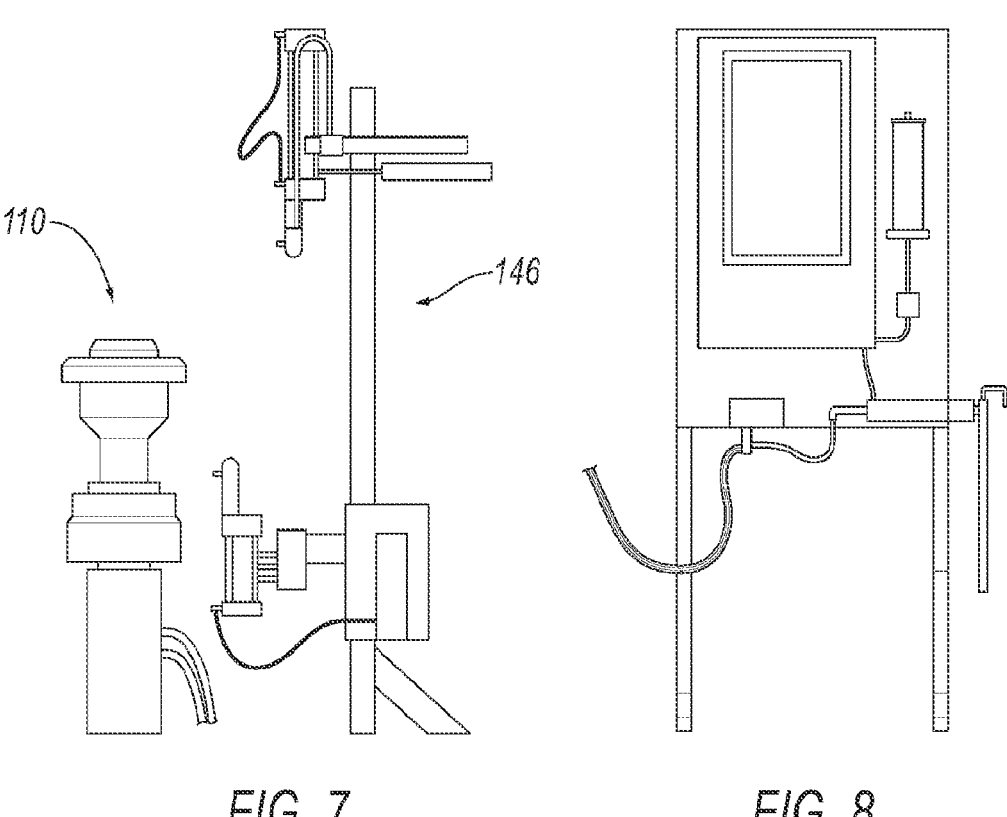
*FIG. 7*            *FIG. 8*
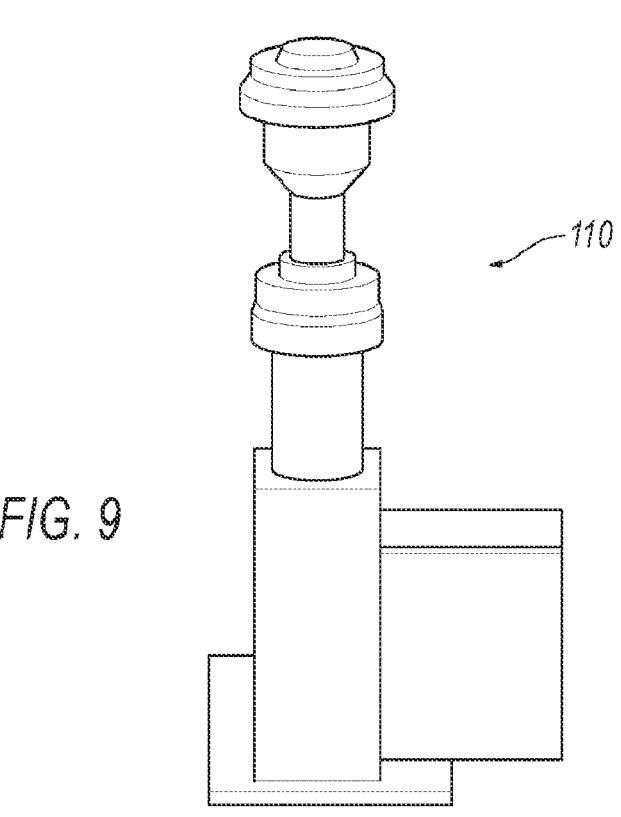
*FIG. 9*

1100

ROBOTIC CELL SYSTEM FOR BALANCING A WHEEL AND TIRE ASSEMBLY

CROSS-REFERENCE TO RELATED APPLICATIONS

This application is the U.S. National Phase of PCT Application No. PCT/US2021/059176 filed on Nov. 12, 2021, which, in turn, claims the benefit of U.S. provisional application Ser. No. 63/113,148 filed on Nov. 12, 2020, the disclosures of which are hereby incorporated in their entirety by reference herein.

TECHNICAL FIELD

Disclosed herein are robotic cell systems for balancing a wheel and tire assembly.

BACKGROUND

Wheel and tire assembly (WTA) systems often include various assembly points, robots, conveyors, elevators, etc. These components and the processes that they carry out may be cumbersome and WTA specific. Moreover, large WTA assemblies may require specific equipment to facilitate their size and weight.

SUMMARY

A robot of a wheel and tire assembly balancing system configured to transport a wheel and tire assembly (WTA) within a defined perimeter may include a selectively movable arm, an end effector connected to an end of the movable arm and configured to selectively engage a portion of a WTA, and a controller configured to provide instructions to the arm and end effector to selectively move the WTA to at least one of a plurality of stations within the perimeter for providing a balancing process for the WTA, wherein the controller is configured to instruct the end effector to engage with a WTA at a load station, and instruct the arm to move the WTA to a weight apply station and release the WTA at the weight apply station.

A wheel and tire assembly (WTA) balancing system configured to transport a WTA within a defined perimeter may include a robot including a selectively movable arm and an end effector connected to the movable arm and configured to selectively engage a portion of a WTA, and a controller configured to provide instructions to the robot to selectively move the WTA to at least one of a plurality of stations within the perimeter.

A method for a wheel and tire assembly (WTA) system configured to transport a WTA within a defined perimeter may include instructing an arm of the WTA system to move a first WTA to a weight apply station and release the first WTA at the weight apply station, and instructing the arm to move to a load station and to close a grip on a second WTA at the load station the first WTA remains at the weight apply station.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

FIG. 4 illustrates an example gripper assembly of the gripper of the WTA balancing system;

FIG. 5 illustrates an example door assembly of the WTA balancing system;

FIG. 6 illustrates an example door assembly of the WTA balancing system;

FIG. 7 illustrates a portion of a marking system of the balancer station of the WTA balancing system;

FIG. 8 illustrates a portion of the system including a marker reservoir, air intake for pneumatic systems, and balancer spindle lubrication;

FIG. 9 illustrates another portion of the balancer station of the WTA balancing system;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a robotic cell system for balancing a vehicle wheel and tire assembly (WTA). The cell system may apply to WTAs, specifically large WTAs used on large vehicles such as trucks, semi-trucks, equipment vehicles such as tractors, combines, plows, etc. However, other applications may be appreciated, such as smaller WTAs. The system avoids the use elevators, and other equipment typically required to apply balancing weights on a WTA. In some examples, conveyors may be avoided. Traditional systems implement an assembly line type of assembly, using conveyors to bring WTAs to a technician. Such systems may require that the conveyors and assembly systems be specific to each WTA size requiring specific and customized set ups for assembly of each differing WTA. The disclosed balancing system may provide for a balancing system that may handle any number of tire sizes and configurations without the need to create an entire new set up for each tire size, tire grip, tire diameter, etc.

Further, various protocols and safety concerns may require that certain stations, such as an area used for weight application, be enclosed, or segregated, so as to prevent any harm to the technician or other operators. Due to the configuration of the robot cell system, and the various stations within the disclosed system, minimal protective components may be required, while still meeting or exceeding all requirements and standards.

Figure 1:
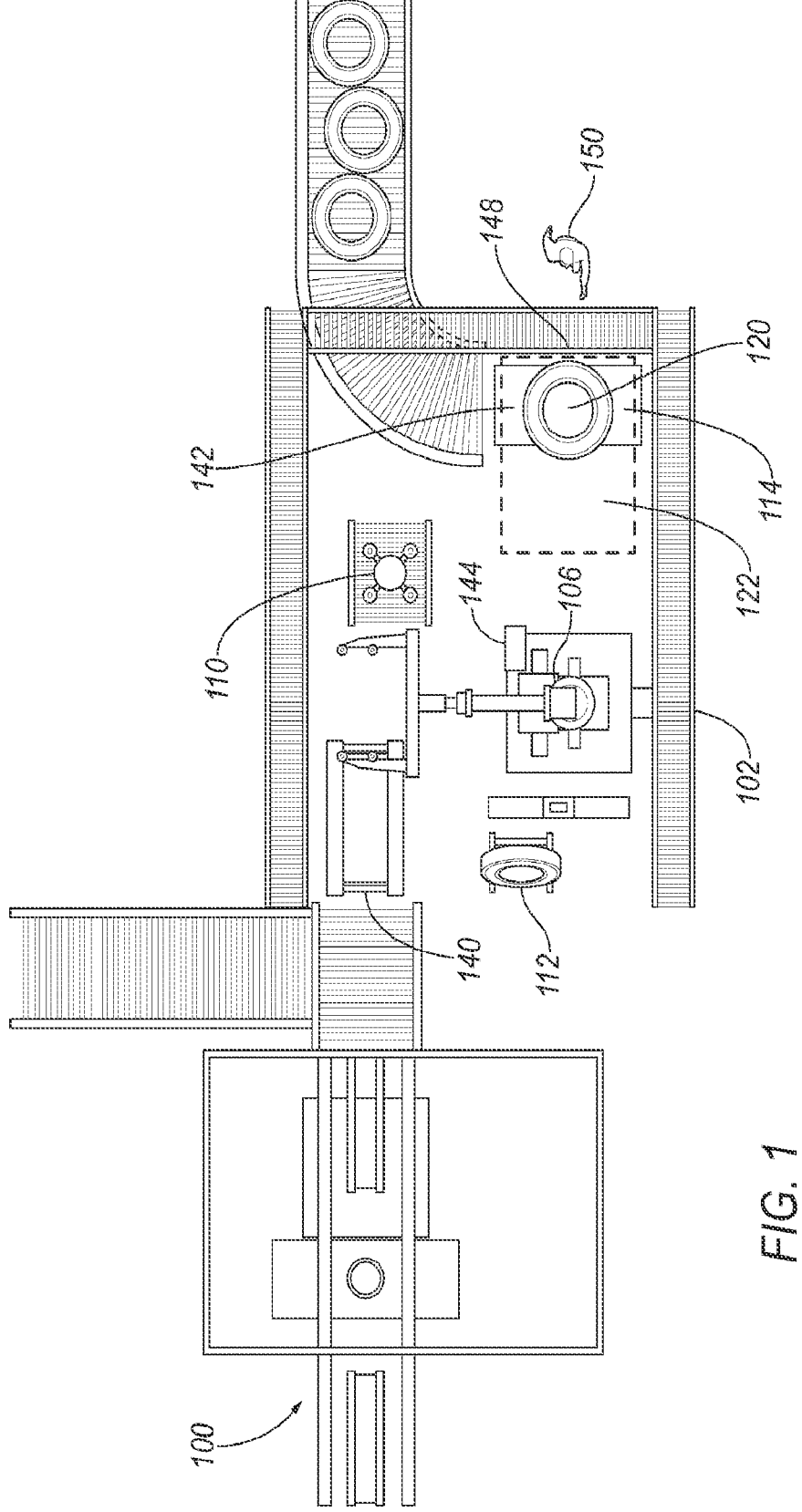
FIG. 1 illustrates a system diagram of a robotic cell for a wheel and tire assembly (WTA) balancing system.

FIG. 1 illustrates an example schematic for a robotic cell balancing system 100 for a vehicle wheel and tire assembly. In the examples discussed herein, the cell system 100 generally is discussed with respect to a WTA balancing system, but other applications may be realized. The cell system 100 may include a perimeter 102 configured to outline the bounds of the system 100. The cell system 100 may include a robot 106 within the perimeter 102. The robot 106 may be configured to move the WTA about the system 100.

Figure 2:
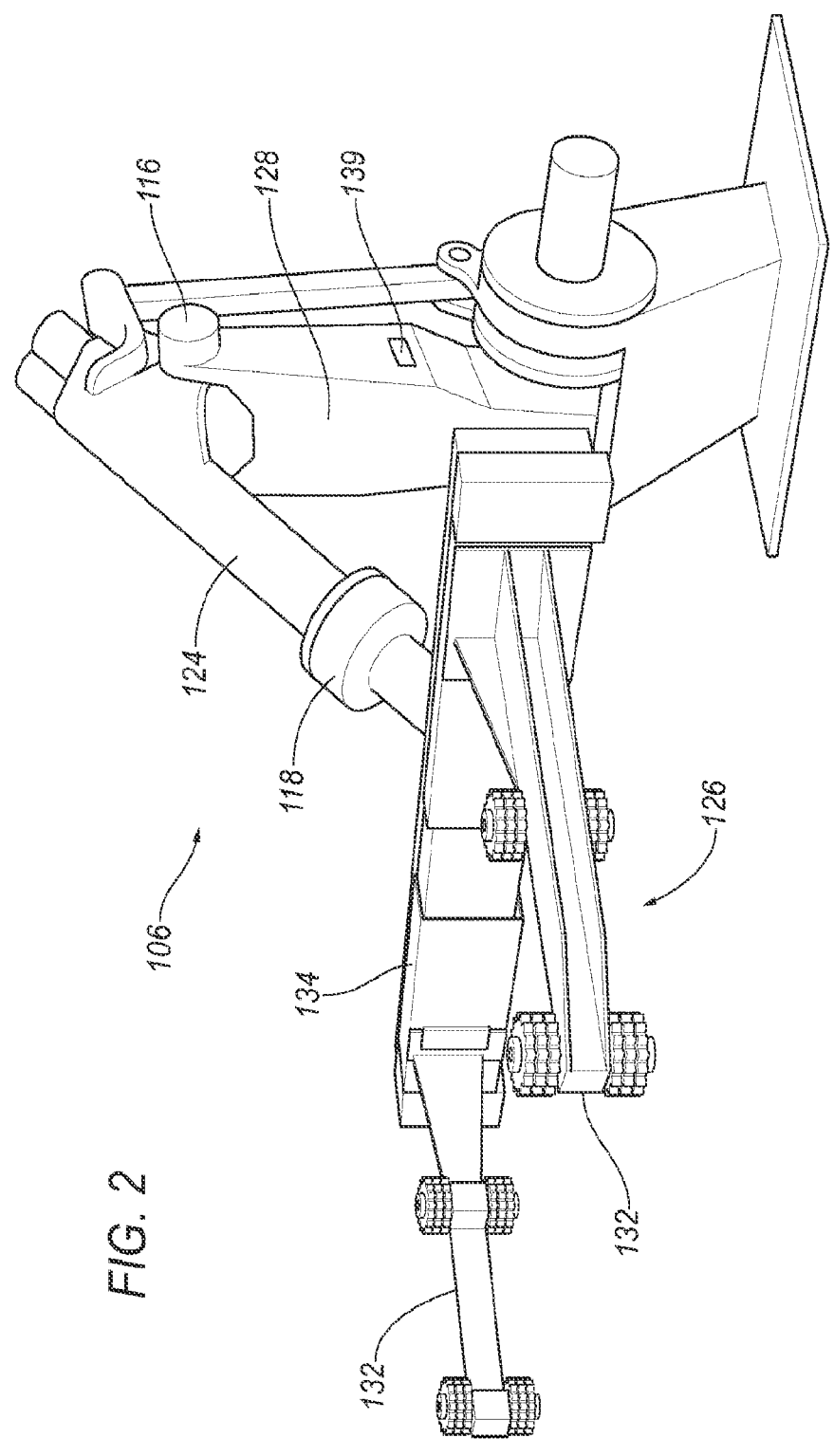
FIG. 2 illustrates a perspective view of a robotic gripper of the WTA system.

Referring to FIG. 2, the robot 106 may have an end effector 126 configured for holding a WTA 120 so as to move the WTA 120 from station to station within the perimeter 102 of the cell system 100. The robot 106 may include at least one articulated joint 116 and a wrist 118. An arm 124 is positioned between the joint 116 and the wrist 118. The robot 106 may be capable of movement with at least three degrees of freedom along one of a selectable plurality of programmable predetermined paths. The end effector 126 may be mounted to the wrist 118 of the robot 106. The end effector 126 may include fingers for gripping the WTA. Various end of arm tooling configurations may be appreciated.

The joint 116 may be mounted to a body portion 128 that is connected to a base portion (not shown). In one exemplary arrangement, the body portion 128 is rotatably-connected to the base portion such that the body portion 128 may be pivoted relative to the base portion. Further, the body portion 128 may be hinged to the base portion such that the body portion 128 may be articulated vertically relative to the base portion.

In one exemplary embodiment, the arm 124 may be connected to the body portion 128 such that the arm 124 may be articulated in any desirable upward or downward position relative the body portion 128. Similar to the rotatable connection of the base portion and body portion 128, the end effector may be rotatably-connected to the arm 124 such that the end effector 126 may be rotated, pivoted or otherwise spun 3600 relative the arm 124, as will be described in further detail below. In other configurations, less than a 360° rotation may be appreciated. Further, in some configurations, the arm 124 itself may rotate.

The end effector 126 may include a plurality of grippers 132. In the example shown, two grippers 132 may be included, one to grip each side of the WTA 120. The end effector 126 may also include at least one sensor that is configured to locate certain portions of the WTA 120. In one exemplary arrangement, the sensor is an optical sensor such as an LED sensor. However, other sensors may be used.

The grippers 132 may be carried on platforms 134 that are selectively moveable from a releasing position to a gripping position. In the releasing position, the opposing grippers 132 are moved away from one another. In the gripping position, the opposing grippers 132 are moved toward one another to a distance that is approximately the width of the WTA 120.

The grippers 132 may be configured to grip the sides of the WTA 120 around the outer diameter of the WTA. By gripping the WTA 120 from the sides, the robot 106 may move, rotate, and flip the WTA 120. The grippers 132 may also grip the WTA 120 from above as well.

The robot 106 may be configured to grip the WTA 120 from the sides and move the WTA from station to station during the WTA balancing process. In some examples, and as discussed in greater detail below, the robot 106 may grip, rotate, move, turn, set down, pick up, the WTA 120. The robot 106 may set a first WTA at a first station, move a second WTA to another station, and then return to remove the first WTA from the first station. By systematically moving WTAs, the system 100 may make efficient use of a single robot. Additional robots 106 may also be included within the perimeter 102 or exterior to the perimeter 102.

The robot 106 may be operated by a controller 139 configured to provide instructions for the robot 106. The controller 139 may be in communication with controller 144, which may be arranged at or near the system 100 in FIG. 1. These controllers may form a single controller. Further, while each controller is illustrated as being located at or near the robot 106 and/or the system 100, these components may be controlled remotely, and the controller(s) may be remote from the system 100.

The controllers may control the components via wired or wireless communication, by receiving various signals from the components of the system 100, as well as commands from a user via a user interface, etc. Reference to the "controller" herein may refer to one or both of the controllers 139, 144, as well as a remote controller and may include one or more processors configured to perform instructions, commands and other routines in support of the processes described herein. For instance, the controllers may be configured to execute instructions for operation of the robot 106, door, as well as each component of the various stations and conveyors. A computer-readable medium (also referred to as a processor-readable medium or storage) may be included and include any non-transitory medium (e.g., a tangible medium) that participates in providing instructions or other data that may be read by the processor of the controller. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Returning back to FIG. 1, each station may be a zone arranged within the perimeter 102 and may contribute a specific function of the balancing process. These stations may include a load area or load station 108, a balancer station 110, a calibration wheel station 110, and a weight apply station 114. Operations at each of these stations may operate concurrently with operations at other stations and the robot 106 may move WTAs 120 between the stations. Specifics of each station and position of the robot 106 at various steps of the disclosed process are disclosed in further detail with respect to FIGS. 4-10. The load station 108 may be a delivery station where the WTA 120 may be presented to the system 100 via a first conveyor 140. The load station 108 may also include a platform on the conveyor 140 where the robot 106 may initially grip the WTA 120. Once the robot 106 has picked up the WTA 120 at the load station 108, the robot 106 may move the WTA 120 to the balancer station 110.

The balancer station 110 may include a balancer spindle configured to maintain the WTA 120 thereon. At the balancer station 110, the robot 106 may release the WTA 120 on the spindle. The balancer station 110 may be capable of static balancing as well as dynamic balancing. During dynamic balancing, the spindle may rotate the WTA to locate which, if any, points of the WTA may require more weights to more evenly distribute weight of the assembly. These locations may be identified using sensors, such as load cells. Once the locations are identified, a marker (shown generally in FIG.

7) may advance on the WTA 120 and mark the WTA 120. The marker may apply a mark on the WTA 120 at at least one location on the inside of the WTA 120. More than one mark may be applied, and marks may be applied at each of the first side and second side of the WTA. Each mark may identify a specific location for placement of a weight material on the WTA 120. A mark may be placed at each side of the WTA 120.

The marks may be a form of ink or paint. In other examples the mark may be lasered onto the WTA 120. The marks may also be applied in a station separate and distinct from the balancer station 110.

Once the marker has marked the WTA 120, the marker may then retract. Once the marker has retracted, the robot 106 may advance on the WTA 120 and the grippers 132 may grip the WTA 120.

The robot 106 may remove the WTA 120 from the balancer station 110 and proceed to move the WTA 120 to the weight apply station 114. In one example, the WTA 120 may be flipped prior to being placed at the weight apply station 114.

The weight apply station 114 may include an operator platform 142 configured to receive the WTA 120. The robot 106 may place the WTA 120 on the platform 142. The platform 142 may be within the perimeter 102 and may be selectively closed off from the area outside of the perimeter. This may be done via a physical or figurative vertical plane 148 at the platform 142. In one example, the vertical plane may be a door. The vertical plane 148 may be configured to selectively maintain a barrier, either physically or figuratively, between the platform 142 inside the perimeter 102 and a technician 150 located outside of the perimeter 102.

The vertical plane 148 may be a physical door, such as a vertically opening door, a sliding door, a roll-type type door, etc. The door may be made of a screen or solid material, including clear material, such as glass, plastic, plexiglass, etc., allowing the technician 150 to easily observe the process and WTA 120 within the perimeter 102. The door may also be a in the form of other non-physical barriers, such as light screens.

During assembly, the technician 150 may pick out a weight material from a bin and apply the weight material to the WTAs 120 at the marks. The technician 150 may apply the weight material at each of the first and second sides of the WTA 120. Thus, the technician 150 may reach through the vertical plane 148 to apply the weight material. In the example where the vertical plane 148 includes a door, the door may only be open under specific conditions.

The weight material could be any form of weight material. For example, the weight material could be applied via traditional pound on techniques. The weight material could also be stick on, press weights, etc. In the example of stick-on weights, the weights may be applied from one side of the WTA 120. In the example of pound on weights, the weights may be applied at each side of the WTA 120. In this example, flipping of the WTA 120 at the weight apply station 114 may be necessary, where flipping may not be necessary when stick-on weight materials are used.

A door zone 122 may be defined at an area within the perimeter of the system 100. The door zone 122 may be defined as an area in front of the vertical plane 148 and may be a certain rectangular or circular sized area that is considered to be close to the vertical plane 148. The zone 122 may define the area that must be clear in order for the technician to apply the weight material to the WTA 120. In the event that a portion of the robot 106 is within the door zone 122, the technician 150 may be prevented from placing weights material on the WTA 120. This may be to protect the technician 150 from coming into any possible contact with the robot 106 during the assembly process. This may be done by creating a virtual or physical barrier such that the vertical plane 148 may be a door that is be prevented from opening.

In the example of a physical door, the vertical plane 148 may include a door sensor configured to detect objects within line of the door and/or door frame. The door sensor may detect if and when an object, such as a technician's arm or other body part, obstruct the line of an open door. Such detection may prevent the door from closing.

In both examples of a virtual or physical vertical plane, a status indicator may also be included at or near the vertical plane 148 indicating a current state of the system 100 and/or the vertical plane to users and operators. The status indicator may be a light, for example, configured to illuminate in one of various colors. A green color may indicate that the technician 150 is safe to proceed to open the door, or extend through the vertical plane 148. The indicator may remain green while the weight apply station 114 is safe to use. A red color may indicate that the weight apply station 114 is not safe to use.

In the example of the door, the controller may only instruct the door to open if the robot 106 is not moving within the zone 122. The controller may prevent the door to be open concurrent with movement of the end effector 126 within the zone 122.

Once the WTA 120 has been placed on the platform 142, and once the robot 106 ceases movement within the door zone 122, the controller may instruct the door to open. In this example, the indicator may illuminate green. Once open, the technician 150 may apply weight material at the marks at one of the first side or second side of the WTA 120. Once the technician has applied the weights at one of the sides, the technician may indicate that he or she is complete by pressing a button or actuator on or near the door. If the door sensor indicates that the door opening is free of any obstructions, the door may close.

Once the door is closed, the robot 106 may return to the WTA 120, grip the WTA via the grippers 132, lift the WTA 120, and optionally flip the WTA 120, so that the opposite side is now up. The robot 106 may then place the WTA 120 back on the platform 142. Now that the opposite side of the WTA 120 is facing up, weight material may now be applied to this side. Again, once the WTA 120 has been placed on the platform 142, and once the robot 106 ceases movement within the door zone 122, the controller may instruct the door to open.

Once open, the technician may repeat the previous step and apply weight material at the marks at the other side of the WTA 120 if necessary. Once the technician has applied the weights at the other side, the technician may indicate that he or she is complete by pressing a button or actuator on or near the door. If the door sensor indicates that the door opening is free of any obstructions, the door may close. Once the door closes, a second conveyor 154 may move the WTA 120 out of the perimeter 102.

In the example of a virtual vertical plane 148, similar operation may be appreciated. For example, in the example of a light shield, the light shield may turn on and off similar to the door opening and closing. The light shield may also function as the indicator in this example.

While a single technician 150 and weight apply station 114 are illustrated, more than one weight apply stations may be included in the system 100 with more than one operator, platforms, doors, and weight material bins. Further to this, more than one robot 106 may also be included within the perimeter 102. More than one balancer station 110 may also be included. In some examples, two of each component/station may be included within the perimeter 102. Further, a one-to-one ratio of components may not be necessary. For example, a single balancer station 110 and weight apply station 114 may be included, but two robots 106 may be included, and vice-a-versa.

In one example, a separate set including a robot and balancer station may be included. This set may be configured to perform an audit process on the WTAs during the balancing process. The audit process may occur after the technician 150 has installed the weight material at the weight apply station 114. The second robot may move the WTA to the second balancer where the balancer may provide the controller 144 with data to determine whether the WTA is balanced. If so, the second robot may proceed to grip the WTA and move the WTA back to the conveyor. If the controller 144 determines that the WTA is not appropriately balanced, the first WTA is moved back to the weight apply station for remedial adjustments. This second set of components may be within or outside of the perimeter 102.

The calibration device station 112 may also be included within the perimeter 102. The calibration device station 112 may be a station that optionally houses a calibration device, such as a calibration WTA, for purposes of calibrating the balancer spindle at the balancer station 110. Such calibration may be performed prior to weight material application. That is, the robot 106 may grip the calibration device and move the calibration device to the balancer spindle at the balancer station 110. The balancer station 110 may transmit calibration data to the controller 144 to verify that a known imbalance of the calibration device is recognized by the spindle. Upon completion of the calibration, the robot 106 may move the calibration device from the balancer station 110 back to the calibration device station 112 to store the calibration device at the calibration device station 112 until needed for further calibration. Calibration may not be performed prior to every balancing, but may be performed at various intervals, both in time and/or quantity, as well as at random, or even on demand as instructed by an operator. The ability to store the calibration device within the perimeter 102 and allow the robot 106 to move the calibration device avoids the need for technicians to manually maneuver the calibration device within the system 100.

While the process described has been in relation to a first WTA 120 proceeding from the load station 108 to the weight apply station 114, the process involves the robot 106 continuously progressing WTAs through the various stations concurrently with other WTAs. For example, once a first WTA reaches the weight apply station 114, and a second WTA may be picked up at the load station 108 and placed on the spindle at the balancer station 110. The balancer station 110 may mark the second WTA while the technician 150 is applying weight material to the first WTA. In some portions of the process, while the marker is marking the second WTA at the balancer station, the robot 106 may be concurrently flipping the first WTA at the weight apply station 114. Once the first WTA has progressed to the second conveyor 154, the robot 106 is moving the second WTA to the platform 142 of the weight apply station 114 and then picking up a third WTA at the load station 108 to continue the process all over again. By continually utilizing the robot 106 to move the WTAs 120 from station to station, but preventing movement of the robot 106 within the door zone 122, a more effective and efficient, yet safe, WTA balancing system is provided.

Figure 3:
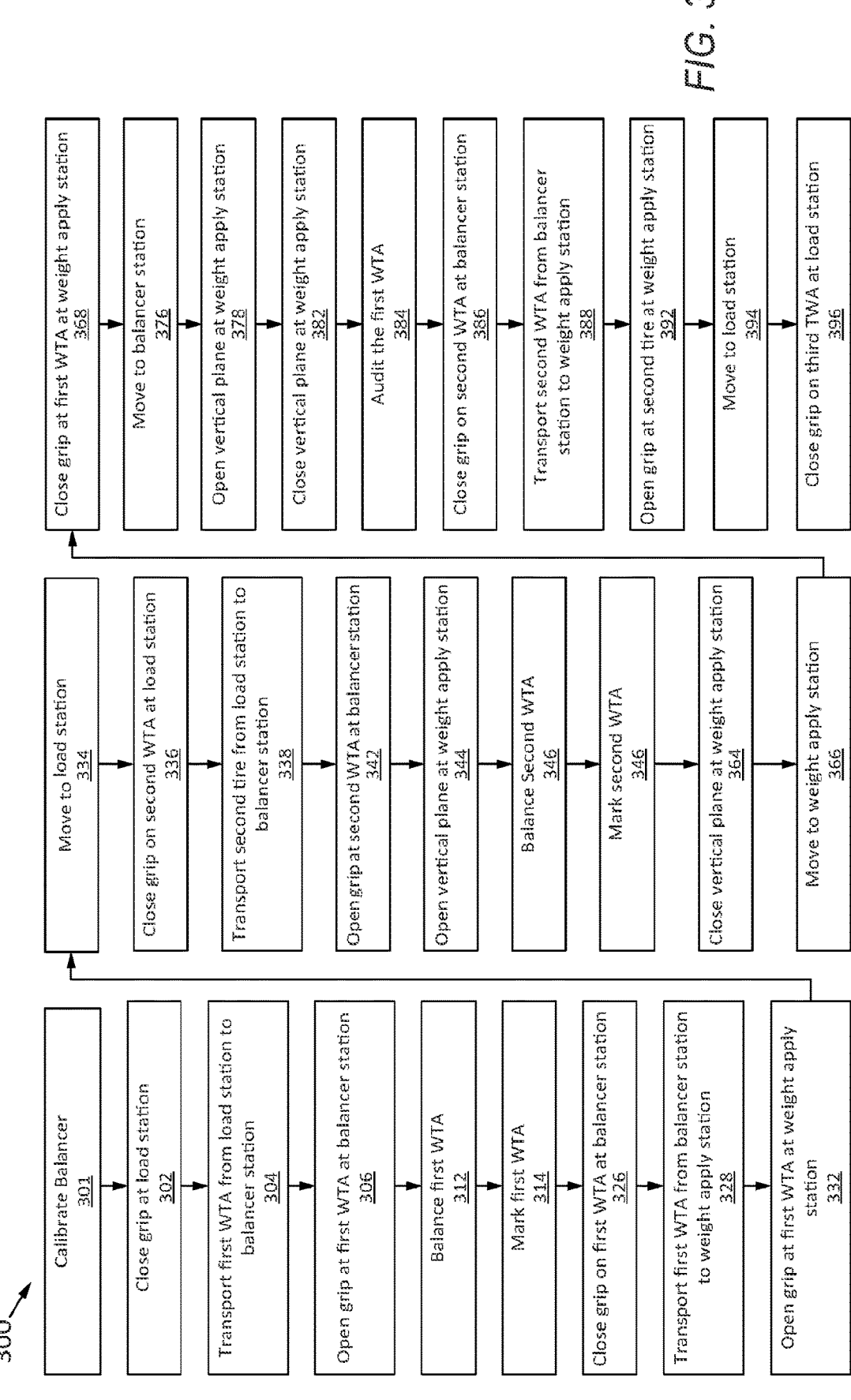
FIG. 3 illustrates an example process for the robotic cell WTA assembly balancing system.

FIG. 3 illustrates an example process 300 for the WTA balancing system. This process 300 illustrates the ability for the system to concurrently perform functions while maintaining operator distance. As explained above, the controllers 139, 144 may control the components, robots, and various features of each station. Additionally or alternatively, special purpose controllers may provide instructions to the various components.

The process 300 may begin at block 301 where the system 100 may conduct calibration of the balancer. This may be done, as explained above, by the robot 106 moving to the calibration device at the calibration device station 112 and picking up the calibration device and moving the calibration device to the balancer spindle at the balancer station 110. The balancer station 110 may transmit calibration data to the controller 144 to verify that a known imbalance of the calibration device is recognized by the spindle. Upon completion of the calibration, the robot 106 may move the calibration device from the balancer station 110 back to the calibration device station 112 to store the calibration device at the calibration device station 112 until needed for further calibration. Calibration may not be performed prior to every balancing, but may be performed at various intervals, both in time and/or quantity, as well as at random, or even on demand as instructed by an operator. The ability to store the calibration device within the perimeter 102 and allow the robot 106 to move the calibration device avoids the need for technicians to manually maneuver the calibration device within the balancing system 100.

The process 300 may then proceed to block 302 where the robot 106 may close grip via the grippers 132 at the first WTA at the load station 108. At block 304, the robot 106 may transport the first WTA from the load station 108 to the balancer station 110. The grippers 132 may then open grip on the first WTA 120 in order to place the first WTA at the balancer station 110 at block 306.

At the balancer station 110, the first WTA may be balanced at block 312. As explained, this may be done using various sensors, spinning the WTA, etc.

At block 314, the balancing system 100 may mark the first WTA. This may include advancing the marker on the first WTA and marking the first side of the first WTA. The marker may then retract and then advance to mark the second side of the first WTA. In some examples, marking may only be necessary at one side of the WTA, e.g., for stick-on weight materials. The marker may then retract to move out of the way of the WTA.

At block 326, the robot 106 may close the grip on the first WTA at the balancer station 110. At block 328, the robot 106 may transport the WTA 120 from the balancer station 110 to the weight apply station 114. In some examples, and depending on the type of weight material being applied, the robot 106 may further flip the WTA during transport so that the opposite side is face up. At block 332, the robot 106 may open grip on the first WTA and place the WTA at the platform 142 of the weight apply station 114.

The robot 106 may then move to the load station 108 at block 334 and close grip on a second WTA at the load station 108 at block 336. The robot 106 may then transport the second WTA from the load station 108 to the balancer station at block 338. At block 342 the robot 106 may open the grip on the second WTA at the balancer station 110.

Once the robot 106 ceases movement upon placing the second WTA at the balancer station 110, at block 344 the vertical plane 148 at the weight apply station 114 may open allowing the technician 150 to apply weight material to one side of the first WTA. As explained above, the vertical plane 148 may be a physical plane such as a door, or a figurative one that simply indicates when the technician is permitted to apply the weight material. Concurrent with this, the balancer station 110 continues to balance and mark the second WTA. For example, at block 346 the second WTA is balanced at the balancer station 110.

At block 348, the balancing system 100 may mark the second WTA. Similar to the marking of the first WTA, this may include advancing the marker on the second WTA and marking the first side of the second WTA. The marker may then retract and then advance to mark the second side of the second WTA. The marker may then retract to move out of the way of the second WTA.

While this is happening, at block 364, the upon the technician 150 completing application of the weight material at the one side of the first WTA, the vertical plane 148 at the weight apply station 114 may physically or figuratively close. Once the vertical plane 148 is 'closed', the robot 106 may resume movement within the door zone 122.

At block 366 the robot 106 may move to the weight apply station 114. The robot 106 may then close grip on the first WTA at the weight apply station 114 at block 368. If needed, the robot 106 may flip the first WTA. The robot 106 may then release the grip on the first WTA and return the first WTA to the weight apply station.

Optionally, the robot 106 may then move to the balancer station at block 376. Once the robot 106 flips the WTA and ceases movement within the door zone 122, the vertical plane 148 at the weight apply station 114 may 'open' at block 382. The technician 150 may then apply the weight material to the other side of the first WTA, if needed. Once the technician 150 is done, the door may close and the first WTA my proceed along the second conveyer 154 at block 382.

At block 384, the balancing system 100 may perform the audit process. This may include moving the robot 106 to the weight apply station 114, gripping the first WTA, and moving the first WTA to the balancer station 110. The balancer station 110 may transmit data to the controller 144 and the controller 144 may determine whether the first WTA is properly balanced. If so, the robot 106 may proceed to grip the first WTA and move the WTA back to the conveyor. If the controller determines that the first WTA is not appropriately balanced, the vertical plane 148 may be reopened and the first WTA is moved back to the weight apply station for remedial adjustments to the weight apply.

As explained above, such an audit process may be performed by the robot 106 and the balancer station 110. However, the balancing system 100 may include the second robot and second balancer station 110 and these components may be dedicated for the auditing of the WTAs. This second set of robot and balancer station may be arranged within the perimeter 102 or outside of the perimeter 102. The WTAs may be audited periodically, on a schedule, or randomly. In the event that a separate robot and balancer station are dedicated to the audit process, the audit process may fit generally seamlessly into the overall process 300 so as to not disturb the process flow during the balancing system 100. In the event that remedial balancing is required, the second robot may integrate the placement of the WTA on the weight apply station 114 so as to quickly and efficiently adjust the weight apply and proceed with the process 300 on the remaining WTA as scheduled.

At block 386, the robot 106 may close the grip on the second WTA at the balancer station 110. At block 388, the robot 106 may transport the second WTA to the weight apply station 114. The robot 106 may flip the WTA along the way.

The robot 106 may open grip on the second WTA at the weight apply station 114 at block 392. At block 394 the robot 106 may move to the load station 108 to start the process over again and grip a third WTA at block 396, similar to block 336. And the process continues with the gripper continually moving between the stations and allowing for concurrent functions to be performed on the WTA to speed up the balancing process. Though assembly times may vary, the example system above may span approximately 35 seconds.

FIG. 4 illustrates an example end effector 126 of the robot 106 of the WTA assembly system 100. The end effector 126 may include a plurality of grippers 132. In the example shown, two grippers 132 may be included, one to grip each side of the WTA 120. The end effector 126 may also include at least one sensor that is configured to locate certain portions of the WTA 120. In one exemplary arrangement, the sensor is an optical sensor such as an LED sensor. However, other sensors may be used.

The grippers 132 may be carried on platforms 134 that are selectively moveable from a releasing position to a gripping position. In the releasing position, the opposing grippers 132 are moved away from one another. In the gripping position, the opposing grippers 132 are moved toward one another, to a distance that is approximately the width of the WTA 120.

The grippers 132 may be configured to grip the sides of the WTA 120 around the outer diameter of the WTA. By gripping the WTA 120 from the sides, the robot 106 may move, rotate and flip the WTA 120. The grippers 132 may also grip the WTA 120 from above as well. The grippers 132 may each include a pair of touch points for gripping the WTA 120.

FIGS. 5 and 6 illustrate example door assemblies of the WTA assembly system 100 where the vertical plane 148 is a physical door configured to open and close depending on activity within the door zone 122 in front of the door.

FIGS. 7-10 illustrate example stations and processes of the WTA assembly of FIG. 1, including at least portions of a load station, calibration station, weight apply station, among others. FIG. 7 illustrates a portion of a marker 146 and the balancer station 110 of the WTA balancing system 100.

As explained throughout, the marker 146 may advance on the WTA 120 and mark the WTA 120. The marker 146 may apply a mark on the WTA 120 at at least one location on the inside of the WTA 120. More than one mark may be applied, and marks may be applied at each of the first side and second side of the WTA. Each mark may identify a specific location for placement of a weight material on the WTA 120.

FIG. 8 illustrates a portion of the WTA balancing system 100 including a marker reservoir, air intake for pneumatic systems, and balancer spindle lubrication. This portion may be arranged outside of the perimeter 102 for easier access to the components. The marker reservoir may include liquid such as ink or paint for marking the WTAs at the marker 146. Other components, controllers, etc., may also be arranged at or near this portion or easy access. The portion may be in fluid communication with the components interior to the perimeter 102.

Figure 10:
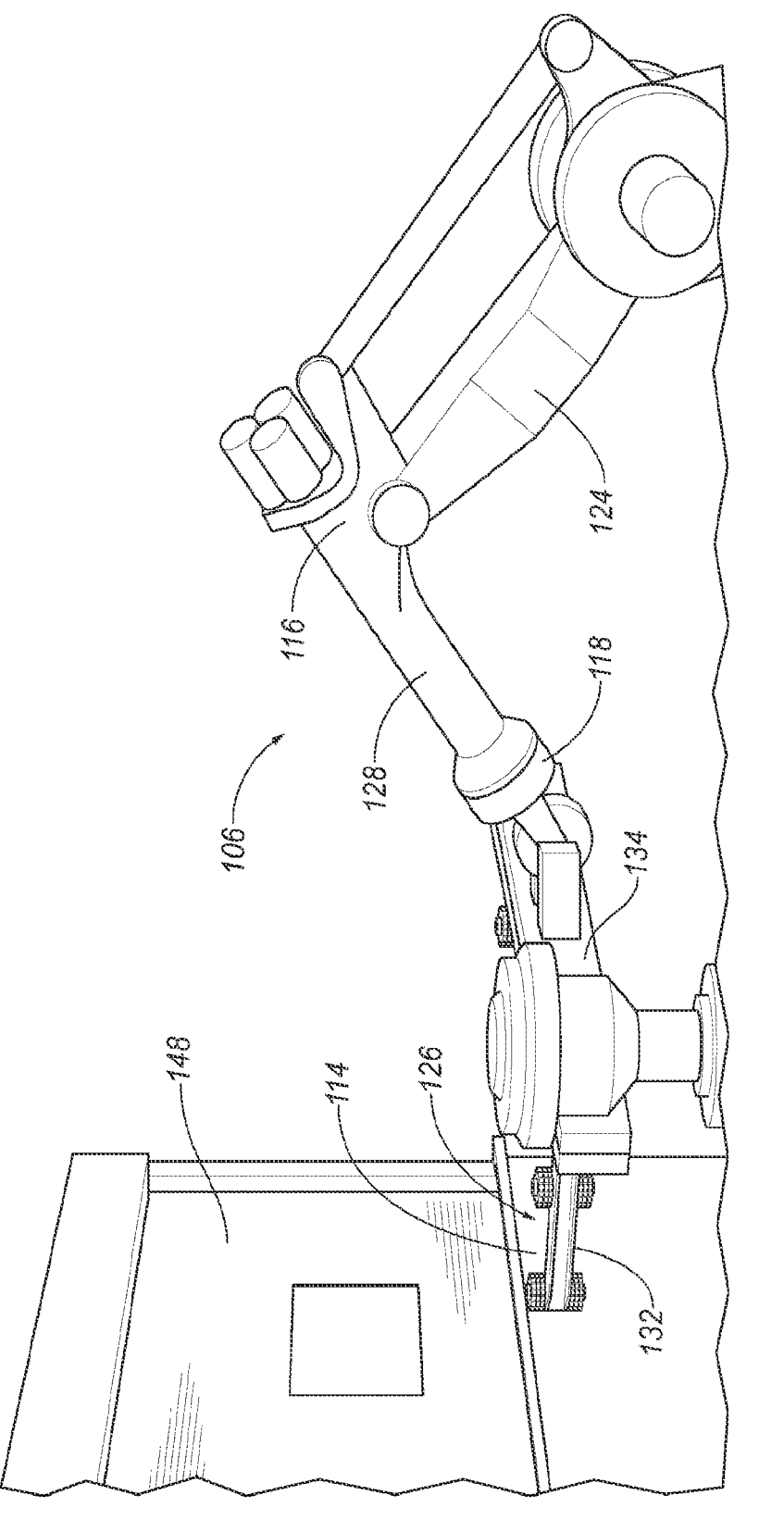
FIG. 10 illustrates a robot of the WTA balancing system with the end effector arranged at the weight apply station.

FIG. 9 illustrations another portion of the balancer station 110 of the WTA balancing system 100. FIG. 10 illustrates the robot 106 of the WTA balancing system similar to FIG. 2, with the end effector 126 arranged at the weight apply station 114. Although not shown, the components in FIGS. 4-10 may include additional guarding, isolation pads, etc.

Figure 11:
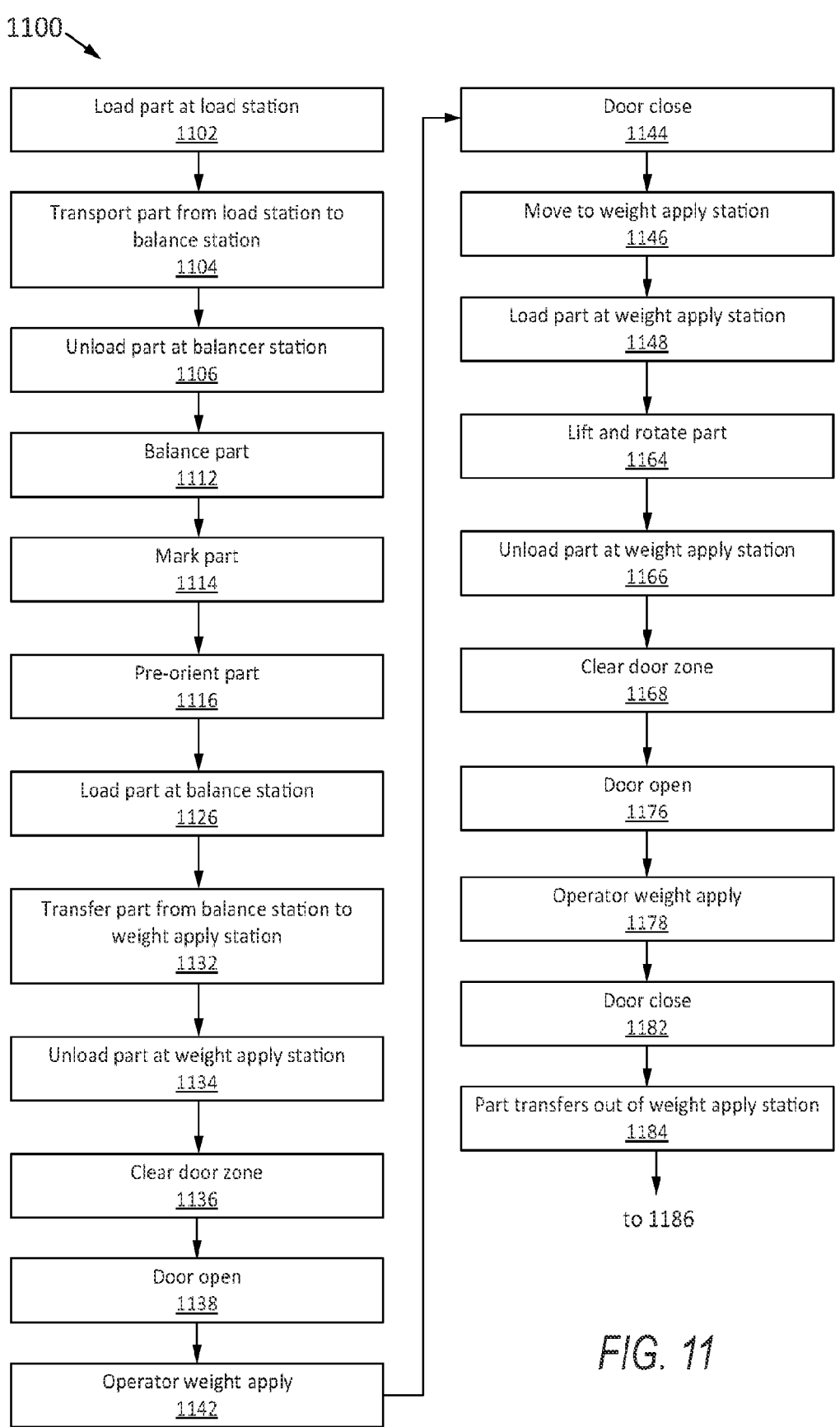
FIG. 11 illustrates another example process for the WTA balancing system.

FIG. 11 illustrates another example process 1100 for the WTA balancing system. This process 300 illustrates the ability for the system to perform functions while maintaining operator distance. As explained above, the controllers 139, 144 may control the components, robots, and various features of each station. Additionally or alternatively, special purpose controllers may provide instructions to the various components.

The process 1100 may begin at block 1102 where the robot 106 may load a part (e.g., WTA) at the load station 108 by engaging and gripping the part via the end effector 126. At block 1104, the robot 106 may transport the part from the load station 108 to the balancer station 110. The robot 106 may unload the part by releasing the grippers 132 at the balancer station 110 at block 1106.

At the balancer station 110, the part may be balanced at block 1112. As explained, this may be done using various sensors, spinning the WTA, etc.

At block 1114, the balancing system 100 may mark the part. This may include advancing the marker on the part and marking the first side of the part. The marker may then retract and then advance to mark the second side of the part. In some examples, marking may only be necessary at one side of the part, e.g., for stick-on weight materials. The marker may then retract to move out of the way of the part.

At block 1116, the balancer may rotate to pre-orient the part so that the part is in a better position to relative to the markings to be engaged by the robot 106. At block 326, the robot 106 may engage or load the part at the balancer station 110. At block 1132, the robot 106 may transport the part from the balancer station 110 to the weight apply station 114. In some examples, and depending on the type of weight material being applied, the robot 106 may further flip the part during transport so that the opposite side is face up. At block 1134, the robot 106 may unload the part and place the part at the platform 142 of the weight apply station 114.

The robot 106 may then move away from the weight apply station 114 and clear the door zone 122 at block 1136. Once the robot 106 ceases movement and clears the zone 122, the door may open at block 1138. At block 1142, the operator may apply the weight material to the part. Upon the operator completing application of the weight material at the one side of the part, the door may close at block 1144.

At block 1146, once the door closes, the robot 106 may move back to the weight apply station 114. The robot 106 may then engage and load the part at the weight apply station 114 at block 1148. At block 1164, the robot 106 may lift and rotate the part. The robot 106 may then unload the part back on the weight apply station at block 1166.

The robot 106 may then move away from the weight apply station 114 and clear the door zone 122 at block 1168. Once the robot 106 ceases movement and clears the zone 122, the door may open at block 1176. At block 1178, the operator may apply the weight material to the part at the other side of the part. Upon the operator completing application of the weight material, the door may close at block 1182. At block 1184, the part may transfer out of the weight apply station 114 via the conveyor.

Figure 12:
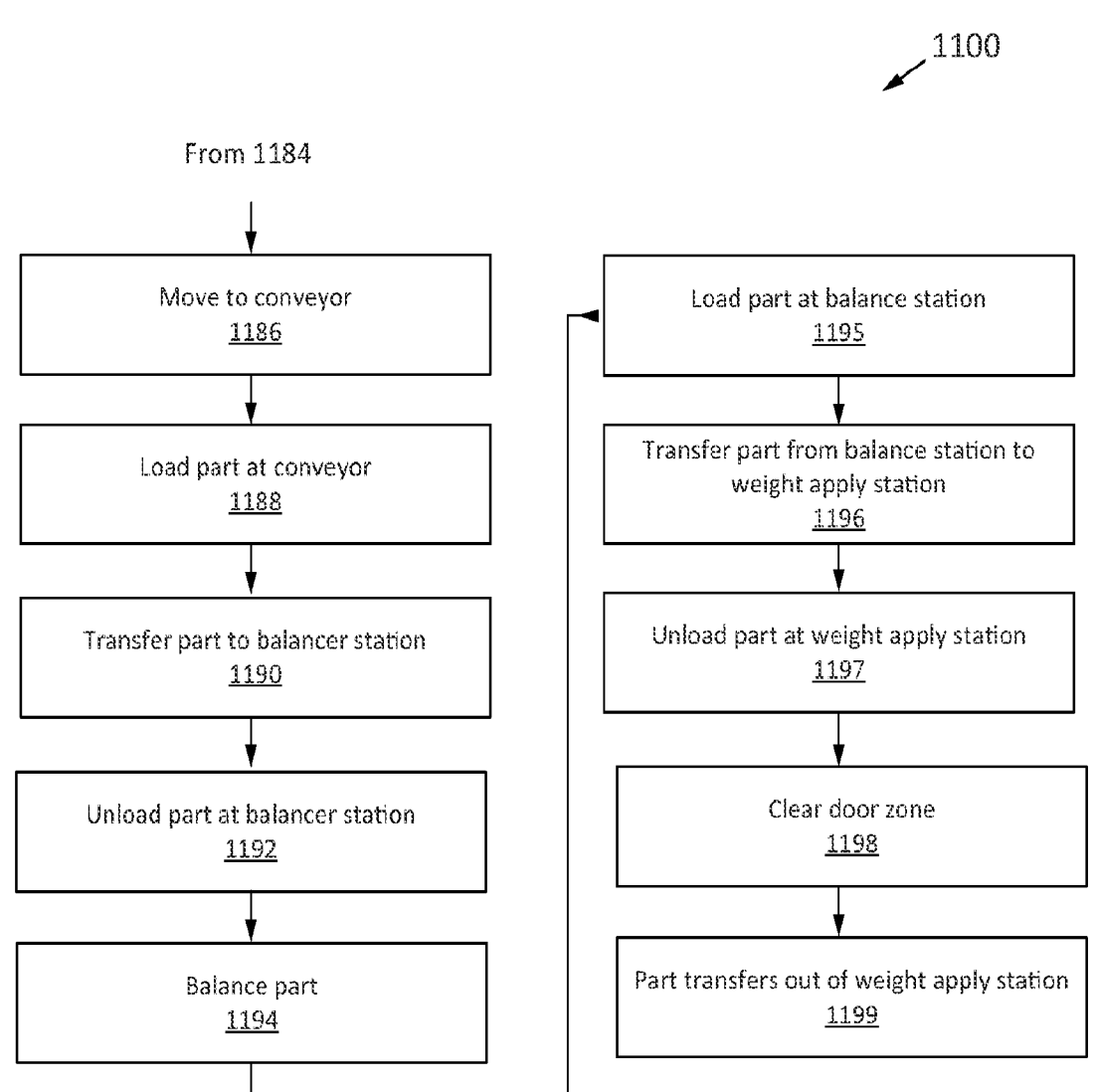
FIG. 12 continues to illustrate the example process for the WTA balancing system of FIG. 11, and includes an audit process.

FIG. 12 continues to illustrate the example process 1100 for the WTA balancing system, and specifically includes an audit process for the WTA balancing system starting at block 1186 where the robot 106 may move to the conveyor. At block 1188, the robot 106 may load or engage the part. The robot 106 may then move the part from the conveyor to the balancer station 110 at block 1190 and unload the part at the balancer station at block 1192.

The balancer station 110 may transmit data to the controller 144 and the controller 144 may determine whether the part is properly balanced at block 1194. If so, the robot 106 may proceed to load the part at block 1195 and move the part back to the conveyor at block 1196. The part may be unloaded at the weight apply station at block 1197, the door closed at block 1198, and the part transferred out of the weight apply station at 1199 on the conveyor. If the controller determines that the part is not appropriately balanced, the part may be remarked, the door may be reopened, and the part may be moved back to the weight apply station for remedial adjustments to the weight apply.

As explained above, such an audit process may be performed by the robot 106 and the balancer station 110. However, the balancing system 100 may include the second robot and second balancer station and these components may be dedicated for the auditing of parts. This second set of robot and balancer station may be arranged within the perimeter 102 or outside of the perimeter 102. The parts may be audited periodically, on a schedule, or randomly. In the event that a separate robot and balancer station are dedicated to the audit process, the audit process may fit generally seamlessly into the overall process 1100 so as to not disturb the process flow during the balancing system 100

Figure 13:
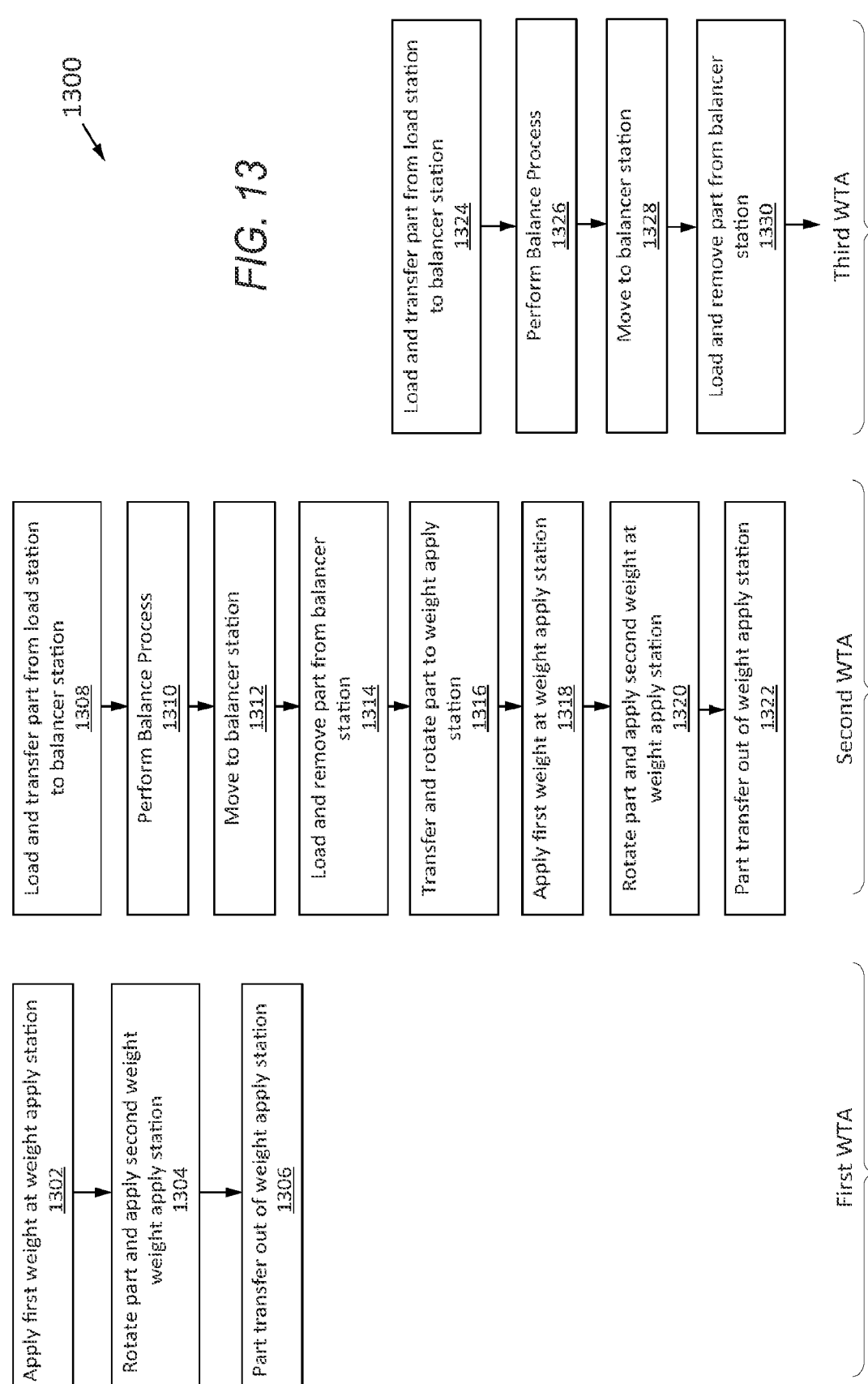
FIG. 13 illustrates another example process for the WTA balancing system showing concurrent tracks for the process across multiple WTAs.

FIG. 13 illustrates another example process 1300 for the WTA balancing system showing concurrent tracks for the process 1300 across three parts. As explained, the system 100 may allow for multiple actions for balancing of the WTAs to be performed concurrently. That is, while one WTA is being balanced, another WTA could be having its weight material applied. As shown in FIG. 12, a first WTA may be at the weight station and the operator may be applying the first weight at block 1302. Concurrently, the robot 106 may be loading and transferring a second part from the load station 108 to the balancer station 110. The robot 106 may then return to the weight apply station and rotate and replace the first WTA at the weight apply station while the second WTA is being balanced at blocks 1304 and 1310, respectively.

Once the second weight material is applied at the first WTA, the first WTA may transfer out of the weight apply station 114 at block 1306 while the robot 106 moves to the balancer station 110 at block 1312. The robot 106 may then load and remove the second WTA from the balancer station 110 at block 1314 and transfer and rotate the second WTA to the weight apply station 114. At block 1318, the operator may apply the first weight material concurrent with the robot 106 moving to the load station, loading, and transferring a third WTA to the balancer station 110 at block 1324.

The robot 106 may then return to the weight apply station and rotate and replace the second WTA at the weight apply station 110 while the third WTA is being balanced at blocks 1320 and 1326, respectively.

Once the second weight material is applied at the second WTA, the second WTA may transfer out of the weight apply station 114 at block 1322 while the robot 106 moves to the balancer station 110 at block 1328. The robot 106 may then load and remove the third WTA from the balancer station 110 at block 1330 and the process may continue with third, fourth, fifth, WTAs, and so on.

Figure 14:
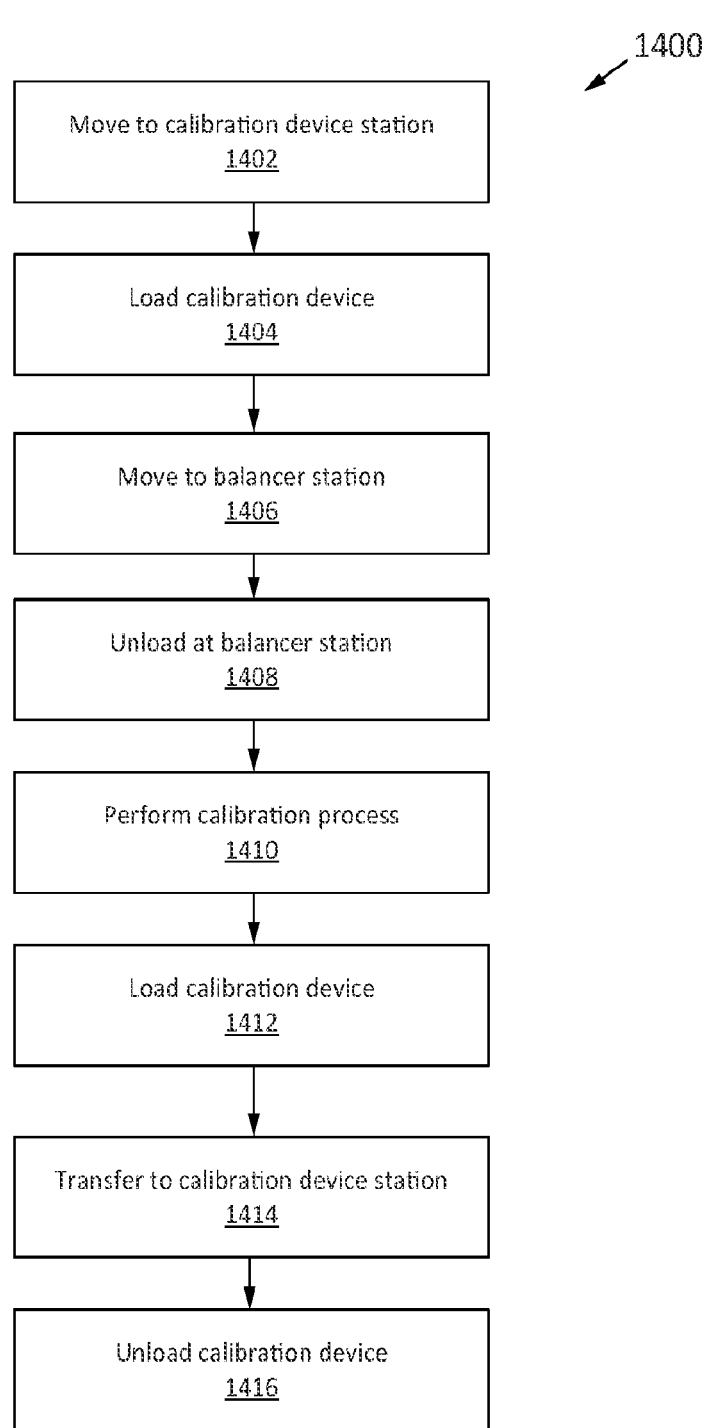
FIG. 14 illustrates another example process for the WTA balancing system showing a calibration process.

FIG. 14 illustrates another example process 1400 for the WTA balancing system 100 showing the calibration process. This calibration process may be similar to the process described above with respect to block 301 in FIG. 3. At block 1402 the robot 106 may move to the calibration device station 112. This station may house the calibration device or tool that may be used to calibrate the balancer station 110. At block 1404 the robot 106 may load the calibration device and move the calibration device to the balancer station 110 at block 1406.

The robot 106 may unload the calibration device at the balancer station 110 at block 1408. At block 1410 the balancer station 110 may perform the calibration process. This may include transmitting calibration data to the controller 144 for determining and calibrating the balancer station 110. This may ensure that the balancer station 110 is appropriately calibrated so as to effectively and accurately balance the WTAs. The controller 144 may compare the received data to known data and adjust settings, standards, predefined values, etc., for the balancer for calibration thereof.

Once calibration data has been transmitted to the controller 144, the robot 106 may load the calibration device at block 1412 and remove and transfer the calibration device back to the calibration device station 112 at block 1414. The robot 106 may then unload the calibration device 1416 and replace it at the calibration device station 112.

Accordingly, described herein is a WTA balancing system that has a robot within a cell defined by a perimeter that allows for functions to be performed on more than one WTA, significantly decreasing assembly process time as well as maintaining or improving certain safety features. Customization and more than one robot, balancer station, etc., may be available, as well as calibration methods and audit methods, each aiding in the efficiency and accuracy of the balancing system.

The embodiments of the present disclosure generally provide for a plurality of circuits, electrical devices, and at least one controller. All references to the circuits, the at least one controller, and other electrical devices and the functionality provided by each, are not intended to be limited to encompassing only what is illustrated and described herein. While particular labels may be assigned to the various circuit(s), controller(s) and other electrical devices disclosed, such labels are not intended to limit the scope of operation for the various circuit(s), controller(s) and other electrical devices. Such circuit(s), controller(s) and other electrical devices may be combined with each other and/or separated in any manner based on the particular type of electrical implementation that is desired.

It is recognized that any controller as disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any controller as disclosed utilizes any one or more microprocessors to execute a computer-program that is embodied in a non-transitory computer readable medium that is programmed to perform any number of the functions as disclosed. Further, any controller as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware based inputs and outputs for receiving and transmitting data, respectively from and to other hardware based devices as discussed herein.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A robot of a wheel and tire assembly balancing system configured to transport a wheel and tire assembly (WTA) within a defined perimeter, comprising:
a selectively movable arm;
an end effector connected to an end of the movable arm and configured to selectively engage a portion of a WTA; and
a controller configured to provide instructions to the arm and end effector to selectively move the WTA to at least one of a plurality of stations within the perimeter for providing a balancing process for the WTA, wherein the controller is configured to
instruct the end effector to engage with a WTA at a load station,
instruct the arm to move the WTA to a weight apply station and release the WTA at the weight apply station,
instruct the arm to move to a load station and to engage with a next WTA at the load station during installation of at least one weight on the WTA at the weight apply station,
instruct the arm to move the next WTA to a balancer station, and
instruct the end effector to release grip on the next WTA at the balancer station.

2. The robot of claim 1, wherein the controller is further configured to
Instruct, prior to instructing the arm to move to a load station to engage with the net WTA, the end effector to close grip on a calibration device arranged within the perimeter,
instruct the arm to move the calibration device to the balancer station,
instruct the end effector to release grip on the calibration device at a balancer station; and
receive data from the balancer station to confirm calibration of the balancer station.

3. The robot of claim 1, further comprising an indicator at the weight station indicating a status of the weight station relative to technician approval to apply weights to the WTA, wherein the controller is further configured to
receive a signal from a sensor at the weight station indicative of an area adjacent the weight station being clear of any objects; and
instruct the indicator to update in response to the signal.

4. The robot of claim 1, wherein the controller is further configured to
once the next WTA is arranged at the balancer station, instruct the arm to move to the weight apply station; and instruct the end effector to engage with the WTA at the weight apply station.

5. The robot of claim 1, wherein the end effector includes at least one gripper configured to selectively engage a portion of the WTA.

6. The robot of claim 5, wherein the at least one gripper includes at least two grippers arranged on platforms that are laterally movable with respect to one another in order to grip and release the WTA.

7. A wheel and tire assembly (WTA) balancing system configured to transport a WTA within a defined perimeter, comprising:

a robot including a selectively movable arm and an end effector connected to the movable arm and configured to selectively engage a portion of a WTA;

a controller configured to provide instructions to the robot to selectively move the WTA to at least one of a plurality of stations within the perimeter; and an indicator at the weight station indicating a status of the weight station relative to technician approval to apply weights to the WTA wherein the controller is further configured to receive a signal from a sensor at the weight station indicative of an area adjacent the weight station being clear of any objects; and instruct the indicator to update in response to the signal.

8. The system of claim 7, further comprising a weight apply station arranged at the perimeter.

9. The system of claim 8, further comprising a first balancer station arranged within the perimeter.

10. The system of claim 9, wherein the controller is further configured to instruct robot to move a calibration device arranged within the perimeter to a balancer station, and receive data from the balancer station to perform calibration of the balancer station.

11. The system of claim 9, wherein the controller is further configured to move the WTA from the balancer station to the weight apply station.

12. The system of claim 9, wherein the controller is further configured to instruct the robot to move a next WTA from a load station to the balancer station while the WTA is at the weight apply station.

13. The system of claim 9, further comprising a second robot configured to selecting engage a portion of the WTA, the controller configured to provide instructions to the second robot to selectively move the WTA to at least one of a plurality of stations within the perimeter.

14. The system of claim 13, wherein the controller is further configured to instruct the second robot to move the WTA to another second balance station separate and distinct from the first balance station, and receive data from the second balance station indicative of the balance of the WTA.

15. The system of claim 14, wherein the controller is further configured to instruct the second robot to return the WTA to the weight apply station in response to the controller determining that the WTA is not properly balanced.

16. The system of claim 7 wherein the end effector includes a plurality of grippers configured to selectively engage a portion of the WTA.

17. The system of claim 16, wherein the grippers are arranged on platforms that are laterally movable with respect to one another in order to grip and release the WTA therebetween.

* * * * *